(12) United States Patent
Gharba et al.

(10) Patent No.: US 12,483,511 B2
(45) Date of Patent: Nov. 25, 2025

(54) DEVICE AND METHOD FOR QUEUES RELEASE AND OPTIMIZATION BASED ON RUN-TIME ADAPTIVE AND DYNAMIC INTERNAL PRIORITY VALUE STRATEGY

(71) Applicant: HUAWEI TECHNOLOGIES CO., LTD., Shenzhen (CN)

(72) Inventors: Ahmed Gharba, Munich (DE); Ming Li, Nanjing (CN); Francisco Fons Lluis, Munich (DE); Angela Gonzalez Marino, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 434 days.

(21) Appl. No.: 18/148,967

(22) Filed: Dec. 30, 2022

(65) Prior Publication Data

US 2023/0134758 A1     May 4, 2023

Related U.S. Application Data

(63) Continuation of application No. PCT/EP2020/084584, filed on Dec. 4, 2020.

(51) Int. Cl.
*H04L 47/62* (2022.01)
*H04L 47/625* (2022.01)
*H04L 49/00* (2022.01)

(52) U.S. Cl.
CPC ...... *H04L 47/6235* (2013.01); *H04L 47/6255* (2013.01); *H04L 49/3027* (2013.01)

(58) Field of Classification Search
CPC ............. H04L 47/6235; H04L 47/6255; H04L 49/3027; H04L 49/254
See application file for complete search history.

(56) References Cited

U.S. PATENT DOCUMENTS 6,822,965 B1 * 11/2004 Johnson ................. H04L 47/10
370/398
7,110,359 B1    9/2006 Acharya
(Continued)

OTHER PUBLICATIONS

"IEEE Standard for Local and metropolitan area networks—Bridges and Bridged Networks Amendment 25: Enhancements for Scheduled Traffic," IEEE Std 802. 1Qbv™-2015, Total 57 pages, Institute of Electrical and Electronics Engineers, New York, New York (Approved Dec. 5, 2015).

*Primary Examiner* — Christine Ng
(74) *Attorney, Agent, or Firm* — Leydig, Voit & Mayer, Ltd.

(57) ABSTRACT

The present disclosure relates to controlling queue release in a network. In particular, the disclosure proposes a controller configured to obtain a state of each of a plurality of queues of a network node and determine, based on the states of the queues, whether the utilization of one or more queues exceeds one or more thresholds. If one or more thresholds are exceeded, the controller is configured to generate one or more new priority entries for one or more queues of the plurality of queues and provide the one or more new priority entries to the one or more queues of the network node. Further, the disclosure proposes a network node being configured to provide a state of each of a plurality of queues to a controller, and obtain one or more new priority entries for one or more queues of the plurality of queues from the controller.

20 Claims, 14 Drawing Sheets

(56) References Cited

U.S. PATENT DOCUMENTS

| | | | |
|---|---|---|---|
| 2004/0109450 A1* | 6/2004 | Kang | H04L 47/31 |
| | | | 370/390 |
| 2005/0265302 A1* | 12/2005 | Nishibayashi | H04L 45/00 |
| | | | 370/349 |
| 2008/0225859 A1* | 9/2008 | Mitchem | H04Q 11/0407 |
| | | | 370/395.21 |
| 2008/0228977 A1 | 9/2008 | Dignum et al. | |
| 2013/0182624 A1* | 7/2013 | Sun | H04W 52/0212 |
| | | | 370/311 |
| 2014/0226663 A1* | 8/2014 | Chan | H04L 45/741 |
| | | | 370/392 |
| 2015/0098020 A1* | 4/2015 | Vill | H04N 5/04 |
| | | | 348/513 |
| 2017/0046246 A1* | 2/2017 | Kaulgud | G06Q 30/0282 |
| 2018/0063016 A1* | 3/2018 | Gulati | G06F 9/546 |
| 2018/0191630 A1* | 7/2018 | Kenny | G06F 13/00 |
| 2021/0195392 A1* | 6/2021 | Kojima | H04M 15/8038 |
| 2021/0289494 A1* | 9/2021 | Scott | H04W 72/23 |
| 2021/0409506 A1* | 12/2021 | Radi | H04L 47/6215 |

\* cited by examiner

DEVICE AND METHOD FOR QUEUES RELEASE AND OPTIMIZATION BASED ON RUN-TIME ADAPTIVE AND DYNAMIC INTERNAL PRIORITY VALUE STRATEGY

CROSS-REFERENCE TO RELATED APPLICATIONS

This application is a continuation of International Application No. PCT/EP2020/084584 filed on Dec. 4, 2020 the disclosure of which is hereby incorporated by reference in its entirety

TECHNICAL FIELD

The present disclosure relates to communication networks, and particularly to the switching of scheduled frames. In order to overcome typical instantaneous network overload conditions, the disclosure proposes a controller, an improved network node, and corresponding methods, to implement adaptive and dynamic Internal Priority Value (IPV) (per frame) based on a status of network queues.

BACKGROUND

One critical problem in network switches, routers and gateways may be the overload of the internal queues/first-in first-out (FIFO) memories required to buffer (or momentarily store) network frames that flow from ingress ports to egress ports.

FIG. 1 and FIG. 2 both show an example of a set of queues, which can be found in the frame dispatching stage of the Time-Sensitive Networking (TSN) standard 802.1Qbv. TSN is a set of standard-defined mechanisms for the time-sensitive transmission of data over deterministic Ethernet networks. The IEEE 802.1Qbv time-aware scheduler (TAS) is designed to separate the communication on the Ethernet network into fixed length, and repeating time cycles. According to 802.1Qbv, frames to be transferred can be allocated to one of two or more types of traffic classes (priorities). As shown in FIG. 1 or FIG. 2, traffic classes may comprise traffic classes from #0 to #7. Frames are transferred in cycles corresponding to the traffic class, as defined in a gate control list (GCL), to where the data is allocated. Notably, "o" shown in the GCL indicates that a transmission gate corresponding to a particular traffic class is open, and "C" shown in the GCL indicates that a transmission gate corresponding to a particular traffic class is closed).

Especially during moments of network overload and traffic burst, it is important that network nodes (e.g., switches/routers/gateways) withstand such peaks of traffic by buffering/storing the frames in internal queues to avoid unexpected frame drops due to lack of capacity, which would degrade the quality of service (QoS) of networks.

Most of existing solutions synthesized today in network nodes implement queues of a fixed depth and queue management algorithms per queue. However, given a gateway with N ingress ports and M egress ports, it can occur that, at one particular point in time, some of these ports have low activity (i.e., are quite empty) while other ports are overstressed (i.e., are nearly full). In such conditions, queues of the low activity ports may be unused while queues of other ports are collapsed. This can result in unwanted frame drops.

SUMMARY

In view of the above-mentioned deficiencies, embodiments of the present disclosure aim to introduce devices and methods to overcome typical instantaneous network overload conditions. In particular, embodiments of the present disclosure can avoid frame drops, particularly, the drop of high priority packets, and thus improve QoS in critical network scenarios. One aim is also to optimize the usage of the total amount of memory devoted to queues.

A first aspect of the disclosure provides a controller being configured to: obtain a state of each of a plurality of queues of a network node, wherein the state of a queue is indicative of a utilization of the queue, and wherein each queue is associated with a priority entry; determine, based on the states of the queues, whether the utilization of one or more queues exceeds one or more thresholds, wherein one threshold is associated with each of the plurality of queues; generate one or more new priority entries for one or more queues of the plurality of queues, if one or more thresholds are exceeded; and provide the one or more new priority entries to the one or more queues of the network node.

Embodiments of this disclosure accordingly propose a controller for controlling IPV of queues based on the network queues status. The controller may be implemented directly in hardware (like a co-processor or peripheral of a Microcontroller or System-on-Chip (SoC) device, as a part of the network node or the like), and/or in software (as executable code running on a central processing unit (CPU) of that Microcontroller or SoC as a part of the network node or the like).

This disclosure relies on the state of each queue. In particular, when a queue reaches a defined threshold (i.e., implying that this queue is full or nearly full), such information may be sent to the controller in order to modify the IPV entries, and thus to modify traffic classes/queues of new incoming frames. Thus, IPV entries may be modified at runtime, depending on the traffic needs. An adaptive and dynamic IPV (per frame) based on the network queues status can be implemented.

In an implementation form of the first aspect, the one or more thresholds comprises a first threshold indicative of a nearly full state of a queue.

In particular, the mechanism of the adaptive and dynamic IPV may be triggered based on a flag or an event called Queue Nearly Full Alert (QNFA). This may be implemented using the first threshold defined in this implementation. Notably, Queue Full Alert (QFA) may be not used because it is desired to not wait until the queue is full, otherwise this may lead to packets (frames) drop before the mechanism is applied.

In an implementation form of the first aspect, the state of the queue is indicative of a quantity of frames in the queue.

In an implementation form of the first aspect, the one or more thresholds are configurable.

Notably, the one or more thresholds may be configured for instance based on specific requirements.

In an implementation form of the first aspect, the controller is further configured to: determine that the utilization of one or more queues exceeds the one or more thresholds, if a quantity of frames in the queue exceeds the first threshold; and determine one or more first queues from the plurality of queues, wherein for each of the one or more first queues the quantity of frames exceeds the first threshold.

Optionally, each of the first queues may be a queue with a higher priority. If a QNFA event is detected by the high priority queue, it may request for more buffer.

In an implementation form of the first aspect, the controller is further configured to determine one or more second queues from the plurality of queues, based on one or more default priority entries of the one or more second queues, wherein a default priority entry of each of the one or more second queues is lower than a respective default priority entry of one of the one or more first queues.

Accordingly, the controller would thus search for one or more queues with a lower priority. Such low priority queue may need to give its buffer to the high priority queue.

In an implementation form of the first aspect, the one or more thresholds comprises a second threshold indicative of a nearly empty state of a queue, and/or a third threshold indicative of an empty state of a queue.

The one or more thresholds may be designed to be able to trigger a Queue Nearly Empty Alert (QNEA) event, and/or a Queue empty Alert (QEA) event.

In an implementation form of the first aspect, the controller is further configured to determine the one or more second queues from the plurality of queues, based on the one or more default priority entries of the one or more second queues, a state of each of the one or more second queues, and the second threshold or the third threshold, wherein a quantity of frames in each second queue does not exceed the second threshold or the third threshold.

For instance, if the state of a queue with a lower priority shows that this queue is empty or nearly empty, this may imply that this queue may have free space in the buffer to be given up (e.g., it may be given to a nearly full high priority queue).

In an implementation form of the first aspect, the controller is further configured to generate one or more new priority entries for the one or more first queues, wherein each of the generated one or more priority entries of the one or more first queues equals to a respective default priority entry of one of the one or more second queues.

Optionally, when the nearly full high priority queue, e.g., queue 7 (priority=7), requires buffer and the controller finds a nearly empty or empty low priority queue, e.g., queue 0, (priority=0), a new IPV entry will be generated for queue 7, particularly for arriving frames at queue 7, and these frames will have a new priority entry with the value 0. In this case, the exceeding frames (i.e., the exceeding frames here refer to incoming frames of queue 7, since the QNFA threshold is exceeded) will be re-oriented to queue 0 instead of queue 7. Queue 0 will keep its priority value of 0.

In an implementation form of the first aspect, the generated one or more new priority entries indicates the network node to re-orient one or more arriving frames from the one or more first queues to the one or more second queues.

In particular, after the new IPV entry applied, the high priority queue (queue 7) could deliver its burst packets to queue 0, and thus avoid dropping them.

In an implementation form of the first aspect, each of generated one or more new priority entries is indicative of a priority level, wherein the priority level is configurable.

In an implementation form of the first aspect, the controller is further configured to obtain an updated state of each of the plurality of queues from the network node.

In an implementation form of the first aspect, the controller is further configured to set each of the one or more generated priority entries back to the default priority entry, if it is determined that the utilization of no queue exceeds the one or more thresholds.

Notably, after the high priority queue (queue 7) delivered its burst packets to queue 0, the level in queue 7 (i.e., the utilization of queue 7) may be decreased. If the level is below the QNFA, it means no need to continue to apply this new IPV entry. Thus, the IPV configuration may be set back to the default configuration.

A second aspect of the disclosure provides a network device being configured to: provide a state of each of a plurality of queues to a controller, wherein the plurality of queues are formed at an egress port of the network node, wherein each queue is associated with a priority entry; and obtain one or more new priority entries for one or more queues of the plurality of queues from the controller.

Embodiments of the disclosure accordingly also propose a network device, where the proposed adaptive and dynamic IPV implementation allows optimizing the usage of the memory on the network device, and avoiding frames drop in critical network scenarios. The network node may be a switch, router, gateway and the like. In particular, the network node will apply one or more new IPV entries that are obtained from the controller, where the new IPV entries may be determined based on the queue status provided by the network node.

In an implementation form of the second aspect, the network device is further configured to re-orient one or more arriving frames inside the plurality of queues based on the obtained one or more new priority entries.

As previously described, after the new IPV entry is applied, a nearly full high priority queue may deliver its burst frames to a nearly empty or empty low priority queue. Thus, frame drops in critical network scenarios may be prevented.

In an implementation form of the second aspect, the network device is further configured to provide an updated state of each of the plurality of queues to the controller.

As previously described, after the high priority queue delivered its burst packets to the low priority queue, the level of the high priority queue may become below the QNFA. The updated state will be provided to the controller.

A third aspect of the disclosure provides a method performed by the controller of the first aspect, wherein the method comprises: obtaining a state of each of a plurality of queues of a network node, wherein the state of a queue is indicative of a utilization of the queue, and wherein each queue is associated with a priority entry; determining, based on the states of the queues, whether the utilization of one or more queues exceeds one or more thresholds, wherein one threshold is associated with each of the plurality of queues; generating one or more new priority entries for one or more queues of the plurality of queues, if one or more thresholds are exceeded; and providing the one or more new priority entries to the one or more queues of the network node.

Implementation forms of the method of the third aspect may correspond to the implementation forms of the controller of the first aspect described above. The method of the third aspect and its implementation forms achieve the same advantages and effects as described above for the controller of the first aspect and its implementation forms.

A fourth aspect of the disclosure provides a method performed by the network node of the second aspect, wherein the method comprises: providing state of each of a plurality of queues to a controller, wherein the plurality of queues are formed at an egress port of the network node, wherein each queue is associated with a priority entry; and obtaining one or more new priority entries for one or more queues of the plurality of queues from the controller.

Implementation forms of the method of the fourth aspect may correspond to the implementation forms of the controller of the second aspect described above. The method of the fourth aspect and its implementation forms achieve the same advantages and effects as described above for the network device of the second aspect and its implementation forms.

A fifth aspect of the disclosure provides a computer program product comprising a program code for carrying out, when implemented on a processor, the method according to the third aspect and any implementation forms of the third aspect, or the fourth aspect and any implementation forms of the fourth aspect.

It has to be noted that all devices, elements, units and means described in the present disclosure could be implemented in software or hardware elements or any kind of combination thereof. All steps which are performed by the various entities described in the present disclosure as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings, in which.

DETAILED DESCRIPTION OF EMBODIMENTS

Illustrative embodiments of a method, device, and program product for controlling release of queues in a network node are described with reference to the figures. Although this description provides a detailed example of possible implementations, it should be noted that the details are intended to be examples and in no way limit the scope of the disclosure.

Moreover, an embodiment/example may refer to other embodiments/examples. For example, any description including but not limited to terminology, element, process, explanation and/or technical advantage mentioned in one embodiment/example is applicative to the other embodiments/examples.

As previously discussed, in an existing solution that implements fixed depth queues and a queue management algorithm per queue, it may happen that queues of the inactive ports are unused (i.e., empty) while queues of other ports are collapsed (i.e., full).

Figure 1:
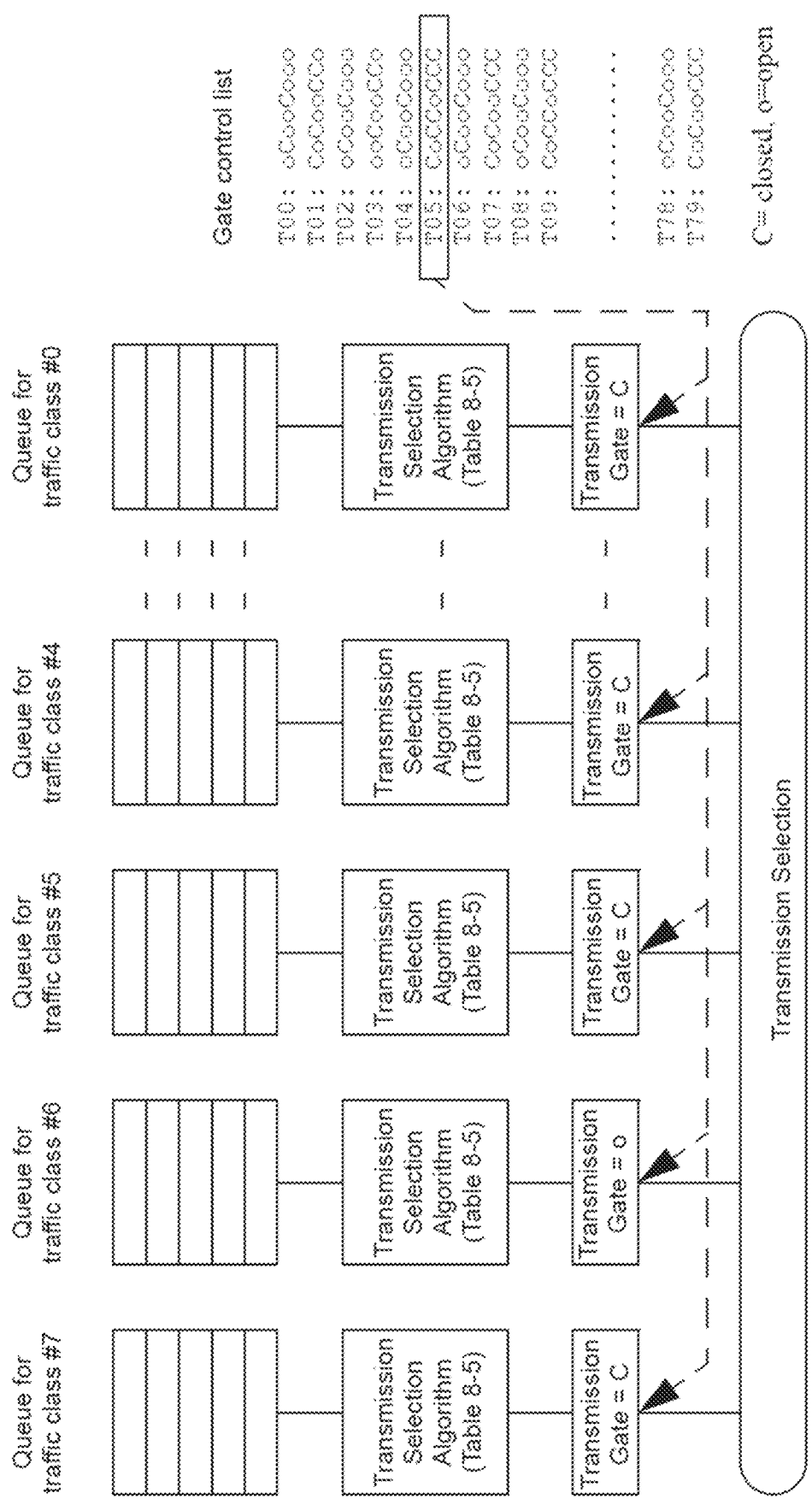
FIG. 1 shows queues according to 802.1Qbv.
Figure 2:
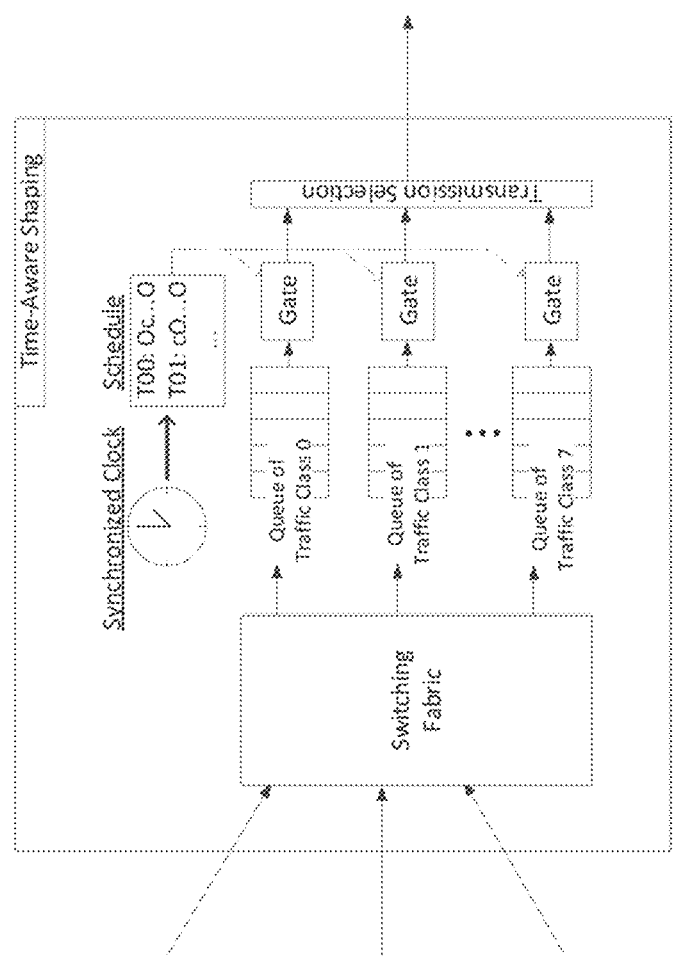
FIG. 2 shows queues according to 802.1Qbv.
Figure 3:
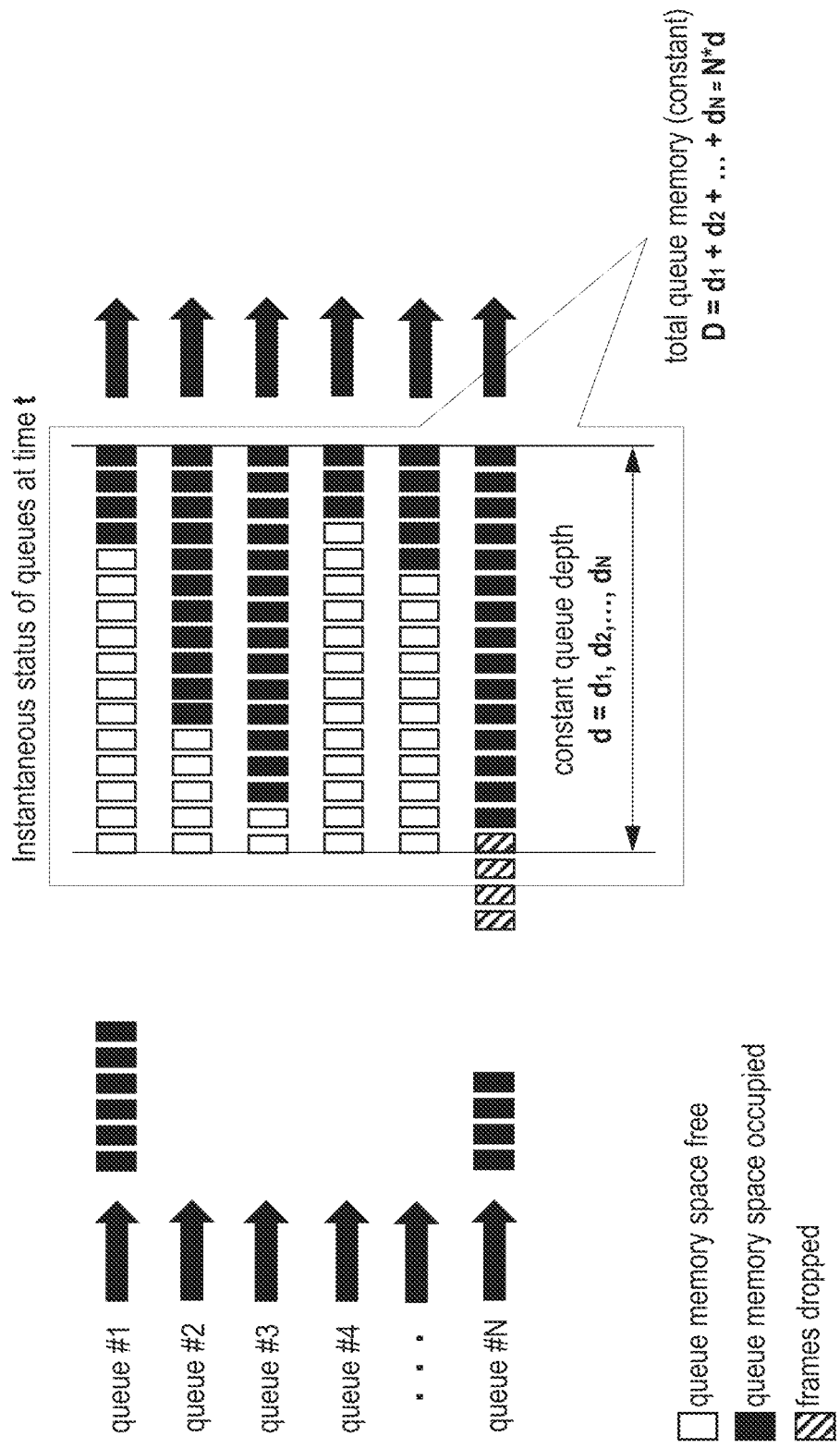
FIG. 3 shows an example of instantaneous status of queues.

FIG. 3 shows an example of an instantaneous status of queues in such a situation. Queue #1 and queue #N both have incoming frames. At time t, frames drop is about to happen in queue #N, due to a lack of space in the queue, even though there is enough empty space in the total queue memory. This may degrade the network QoS. It can be seen that, although the implementation strategy of queue management algorithms per queue and fixed depth queues is quite simple, it is unable to self-adapt to changing traffic conditions.

In order to overcome typical instantaneous network overload conditions, this disclosure proposes to implement an adaptive and dynamic IPV (per frame) based on the status of the network queues.

Figure 4:
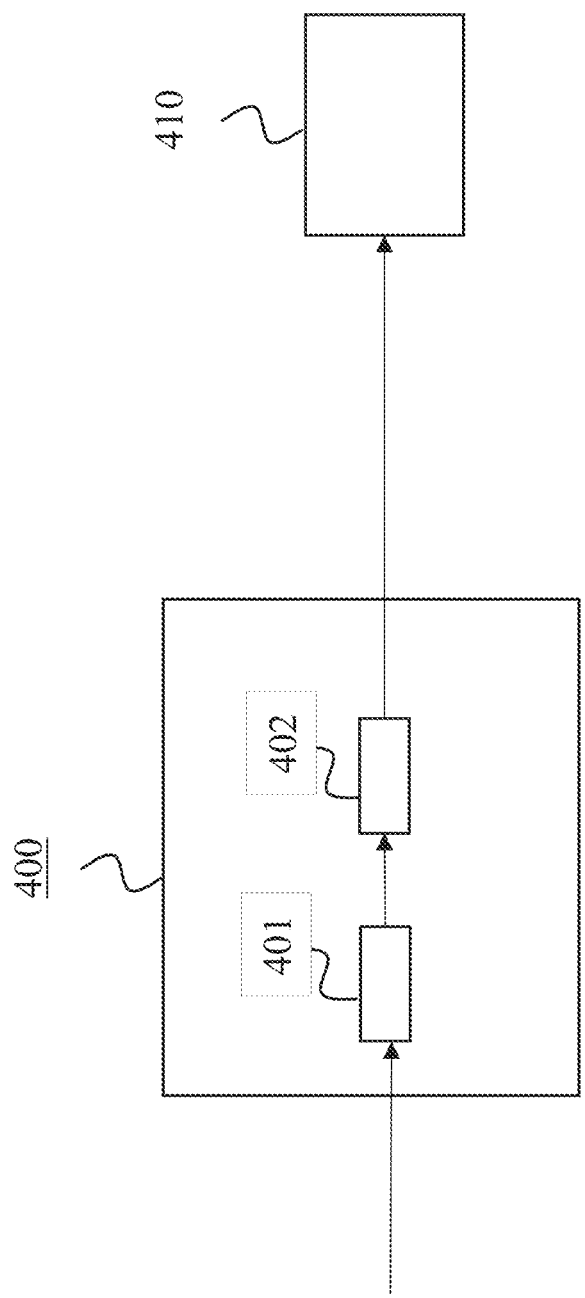
FIG. 4 shows a controller according to an embodiment of the disclosure.

FIG. 4 shows a controller 400 according to an embodiment of the disclosure. The controller 400 may comprise processing circuitry (not shown) configured to perform, conduct or initiate the various operations of the controller 400 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. The controller 400 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the controller 400 to be performed. In one embodiment, the processing circuitry comprises one or more processors and a non-transitory memory connected to the one or more processors. The non-transitory memory may carry executable program code which, when executed by the one or more processors, causes the controller 400 to perform, conduct or initiate the operations or methods described herein.

In particular, the controller 400 is configured to obtain a state 401 of each of a plurality of queues of a network node 410. The state 401 of a queue is indicative of a utilization of the queue, and wherein each queue is associated with a priority entry. The controller 400 is further configured to determine, based on the states 401 of the queues, whether the utilization of one or more queues exceeds one or more thresholds, wherein one threshold is associated with each of the plurality of queues. Then, the controller 400 is configured to generate one or more new priority entries 402 for one or more queues of the plurality of queues, if one or more thresholds are exceeded. Further, the controller 400 is configured to provide the one or more new priority entries 402 to the one or more queues of the network node 410.

The network device 410 may be a switch, a router, a gateway or the like. The plurality of queues may be implemented on an egress port of the network device 410. Typically, each queue is configured with an individual transmission class, which represents an internal priority among all queues. For instance, a transmission class #N has a higher priority than a transmission class #N−1, where N being a positive integer.

The controller 400 may be implemented directly in hardware (like a coprocessor or peripheral of a Microcontroller or SoC device as a part of the network node 410). Optionally, the controller 400 may be implemented in software (as executable code running on a central processing unit or CPU of that Microcontroller or SoC as a part of the network node 410).

Figure 5:
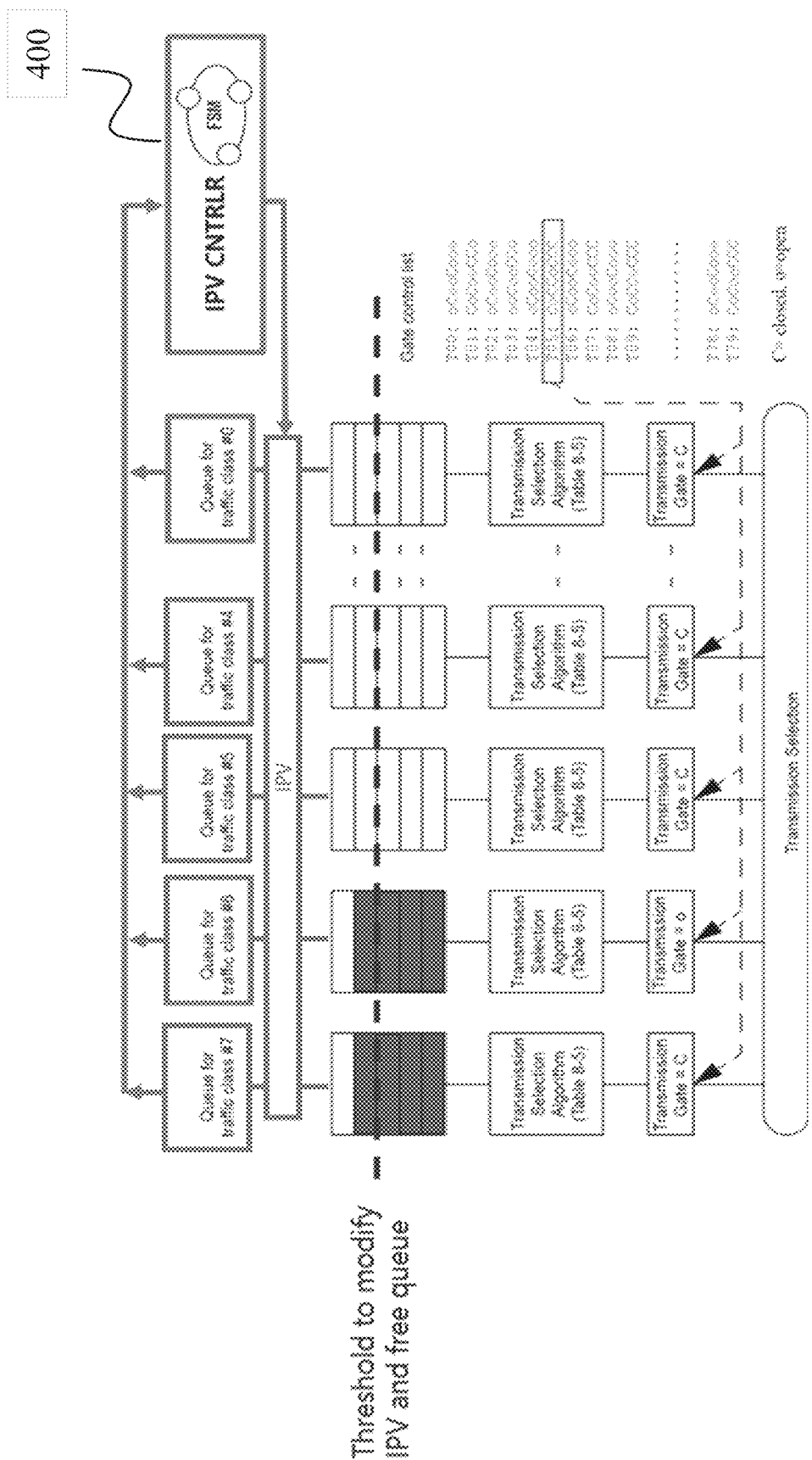
FIG. 5 shows status of queues in a network node, according to an embodiment of the disclosure.

FIG. 5 shows an example of status of queues in the network node 410, according to an embodiment of the disclosure. In particular, the IPV controller shown in FIG. 5 may be the controller 400 shown in FIG. 4. Possibly, the IPV controller may be a finite state machine (FSM) or an arithmetic logic unit (ALU).

The controller 400 as proposed in embodiments of this disclosure relies on the state 401 of each queue. When a queue reaches or exceeds a defined threshold, an event may be triggered and this information is sent to the controller 400, which allows the controller 400 to modify the priority entries 402 associated with queues, and thus to modify traffic of arriving frames.

According to embodiments of the disclosure, one or more configurable thresholds may be set for triggering different events. Optionally, the one or more thresholds may comprise a first threshold indicative of a nearly full state of a queue. In particular, the event triggered by the first threshold may be called QNFA. The threshold shown in FIG. 5 may be the first threshold.

Possibly, another threshold may be set to trigger a Queue Full Alert (QFA) event, i.e., for indicating that the queue is full. However, this event may not be used because it is desired to not wait until the queue is full, otherwise this may lead to frames drop before the mechanism for adapting IPV is applied.

Notably, the state 401 of a queue may be indicative of a quantity of frames in the queue. According to an embodiment of this disclosure, the controller 400 may be configured to determine that the utilization of one or more queues exceeds the one or more thresholds, if a quantity of frames in the queue exceeds the first threshold. Notably, if the quantity of frames in the queue exceeds the first threshold, the QNFA event is triggered.

Further, the controller 400 may be configured to determine one or more first queues from the plurality of queues, wherein for each of the one or more first queues the quantity of frames exceeds the first threshold. That is, if a QNFA event is triggered in one queue, this queue will be identified by the controller 400, here for example it is named as a first queue. Notably, there are be more than one queue that the quantity of frames in the queue exceeds the first threshold.

Knowing that there are queues requesting more buffer (i.e., the one or more first queues, since they are nearly full), the controller 400 would accordingly search for one or more other queues with a lower priority. Such low priority queue may need to give its buffer to the high priority queue.

According to embodiments of the disclosure, the controller 400 may be further configured to determine one or more second queues from the plurality of queues, based on one or more default priority entries of the one or more second queues, wherein a default priority entry of each of the one or more second queues is lower than a respective default priority entry of one of the one or more first queues. Notably, a second queue should not have a priority or a transmission class higher than a first queue.

Possibly, if one or more low priority queues (i.e., the one or more second queues) are found, the controller 400 may modify priority entries for frames in the high priority queues with priority values of the low priority queues (i.e., in this implementation, the one or more first queues and the one or more second queues), in order to make arriving frames at the high priority but overloaded queues to be re-oriented to other low priority queues.

Preferably, the controller 400 would also check whether the low priority queues are capable of receiving additional frames, to avoid frames loss on the low priority queues as well.

Optionally, the one or more thresholds may further comprise a second threshold indicative of a nearly empty state of a queue, and/or a third threshold indicative of an empty state of a queue. Notably, the second threshold may be set for triggering a QNEA event, and the third threshold may be set for triggering a QEA event.

Accordingly, the controller 400 may be further configured to determine the one or more second queues from the plurality of queues, based on the one or more default priority entries of the one or more second queues, a state of each of the one or more second queues, and the second threshold or the third threshold, wherein a quantity of frames in each second queue does not exceed the second threshold or the third threshold.

That is, each of the second queues may be a queue with a priority lower than each of the first queues, and also the state of the second queue should meet certain conditions. In particular, the quantity of frames in each second queue does not trigger a QNFA event or a QFA event. That is, the second queue may have no frame or only a few of frames, thus it is suitable for receiving redirected frames from one of the first queues.

Accordingly, if a suitable low priority queues (i.e., the one or more second queues) are found, the controller 400 may generate new priority entries 402 for the high priority queues and the low priority queues (i.e., in this implementation, the one or more first queues and the one or more second queues), in order to make arriving frames at the high priority but overloaded queues to be re-oriented to other empty or newly empty low priority queues.

In particular, each of the generated one or more priority entries of the one or more second queues may equal to a respective default priority entry of one of the one or more first queues. For instance, when a first queue has a default transmission class #7 (i.e., priority=7), and a second queue has a default transmission class #0 (i.e., priority=0), a new priority entry equal to 0 is generated for the frames of the first queue. The new priority entry 0 of the frames of the first queue indicates the network node 410 to re-orient one or more arriving frames from the first queue to the second queue. In this way, the overloaded first queue is able to use the buffer of the second queue, thereby avoiding the drop of high priority frames. This thus improves the QoS in critical network scenarios.

Further, once the arriving frames being re-oriented, the QNFA event may not be triggered anymore for the first queue. That is, the state of the first queue, i.e., the quantity of frames in the queue, may become below the first threshold.

According to an embodiment of the disclosure, the controller 400 may be further configured to obtain an updated state of each of the plurality of queues from the network node 410. Accordingly, the controller 400 may be further configured to set each of the one or more generated priority entries 402 back to the default priority entry, if it is determined that the utilization of no queue exceeds the one or more thresholds.

Embodiments of this disclosure accordingly also propose a network node 410. As previously described, the network device 410 may be a switch, a router, a gateway or the like.

Figure 6:
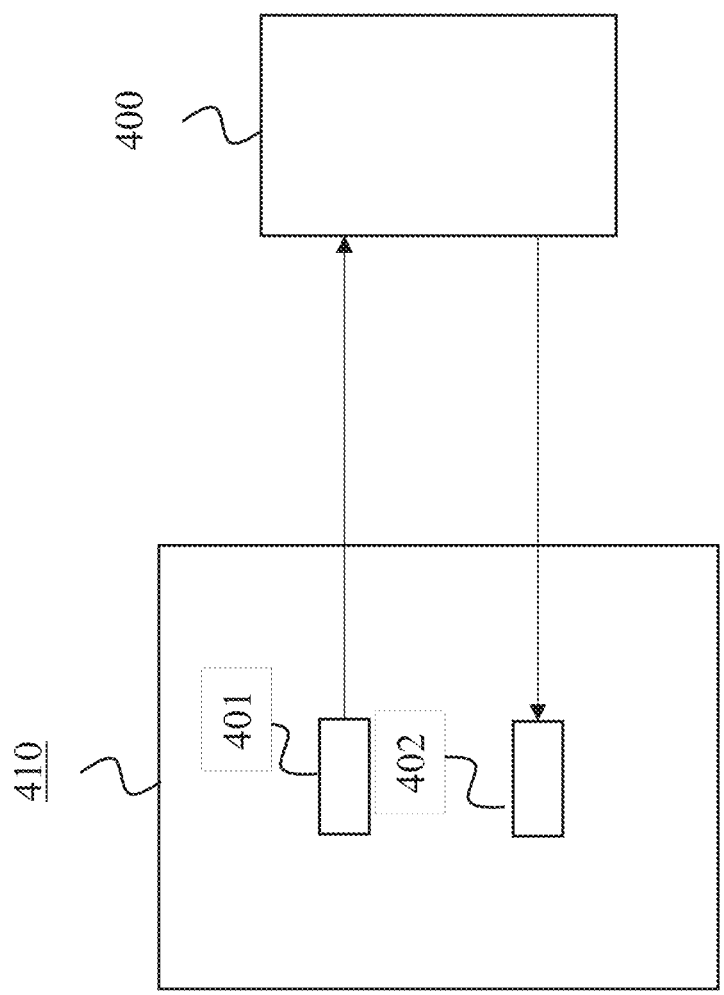
FIG. 6 shows a network node according to an embodiment of the disclosure.

FIG. 6 shows a network node 410 according to an embodiment of the disclosure. The network node 410 may be the network node 410 shown in FIG. 4. The network node 410 may comprise processing circuitry (not shown) configured to perform, conduct or initiate the various operations of the network node 410 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. The network node 410 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the network node 410 to be performed. In one embodiment, the processing circuitry comprises one or more processors and a non-transitory memory connected to the one or more processors. The non-transitory memory may carry executable program code which, when executed by the one or more processors, causes the network node 410 to perform, conduct or initiate the operations or methods described herein.

In particular, the network node 410 is configured to provide a state 401 of each of a plurality of queues to a controller 400. Possibly, the controller 400 may be the controller 400 shown in FIG. 4. Notably, the plurality of queues are formed at an egress port of the network node 410, wherein each queue is associated with a priority entry. The network node 410 is further configured to obtain one or more new priority entries 402 for one or more queues of the plurality of queues from the controller 400.

Notably, traffic needs of the network node 410 are provided to the controller 400 at runtime. Relying on status of the plurality of queues, the controller 400 is able to modify on the fly traffic classes of frames, and thus optimize the usage of the total amount of memory of the network node 410, which is devoted to queues.

According to an embodiment of the disclosure, the network device 410 is configured to re-orient one or more arriving frames inside the plurality of queues based on the obtained one or more new priority entries. Therefore, frames that are going to arrive at an overloaded higher priority queues will be re-oriented to other queues capable of receiving additional frames. This disclosure aims at avoiding the drop of high priority frames/packets, and thus improving the QoS in critical network scenarios.

According to an embodiment of the disclosure, the network device 410 may be further configured to provide an updated state of each of the plurality of queues to the controller 400. As previously described, after the high priority queue delivered its burst packets to the low priority queue, the level of the high priority queue may become below the QNFA. That means, the modified priority entries may not be needed anymore. The updated state will be provided to the controller 400, and the controller 400 may accordingly set back the default priority configuration for the network node 410.

FIG. 7-FIG. 10 show a specific example of an IEEE 802.1Qbv implementation according to an embodiment of this disclosure, each figure showing status of queues in a chronological order.

Figure 7:
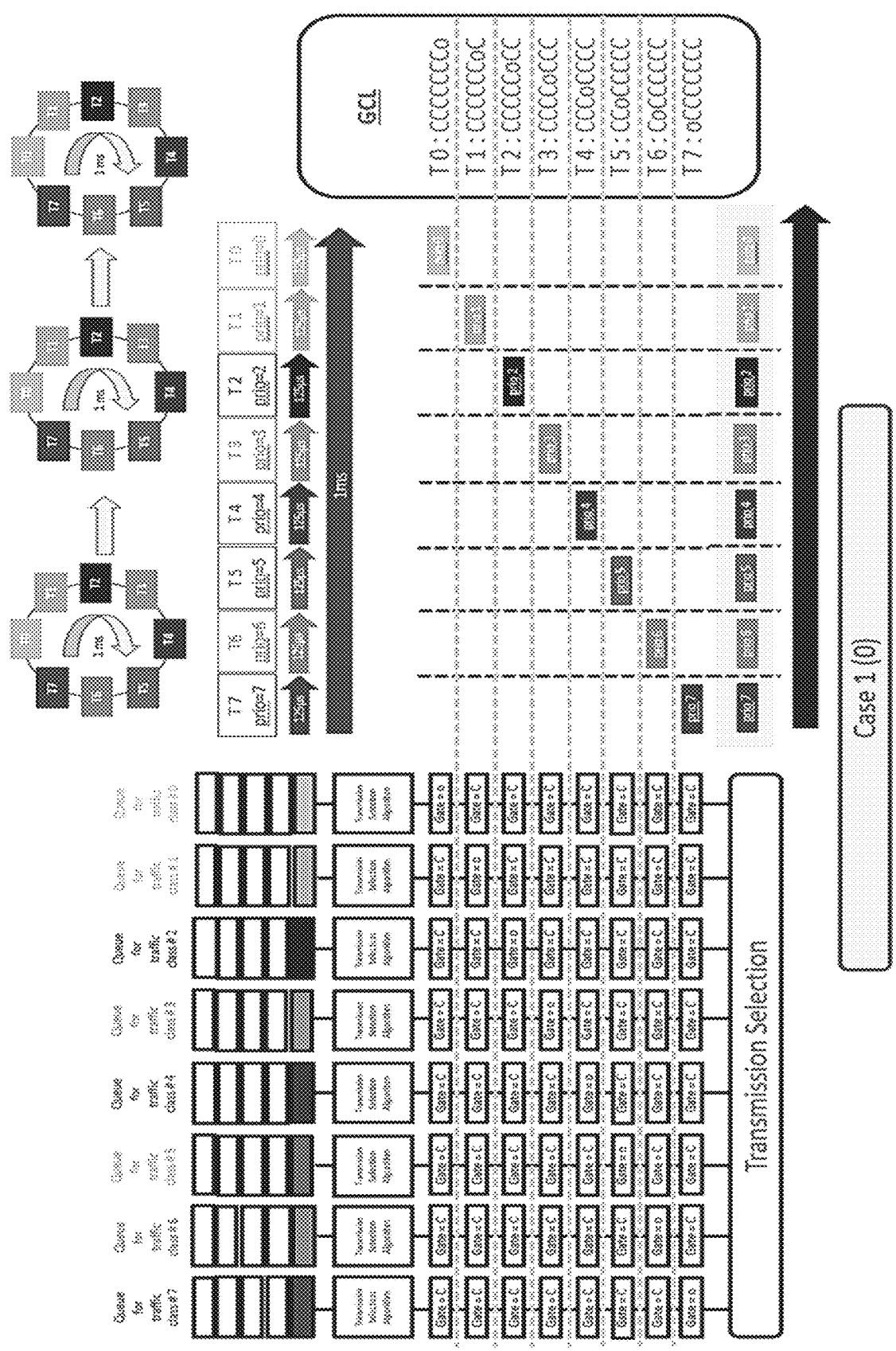
FIG. 7 shows an example of an IEEE 802.1Qbv implementation according to an embodiment of the disclosure.

FIG. 7 shows eight queues of a network node 410, and status of all the queues. Possibly, the network node 410 is a network node shown in FIG. 4 or FIG. 6. It is assumed that a time cycle of 1 ms comprises eight time-slots, i.e., T0, T1, . . . , T7 as shown in FIG. 7. Each time-slot is for a dedicated priority, such as T7 is allocated for the queue with a priority of 7. As previously discussed, each transmission class or traffic class represents a dedicated priority. It is also assumed that a dedicated queue is set for each priority. In this example, the queue for traffic class #7 has the highest priority among all eight queues.

Notably, the time cycle is repeated continuously. Order and status of each transmitting gate is defined in a GCL. In particular, at each time-slot transmission gate for each queue will be open or closed according to the GCL. According to embodiments of this disclosure, the GCL is fixed.

Figure 8:
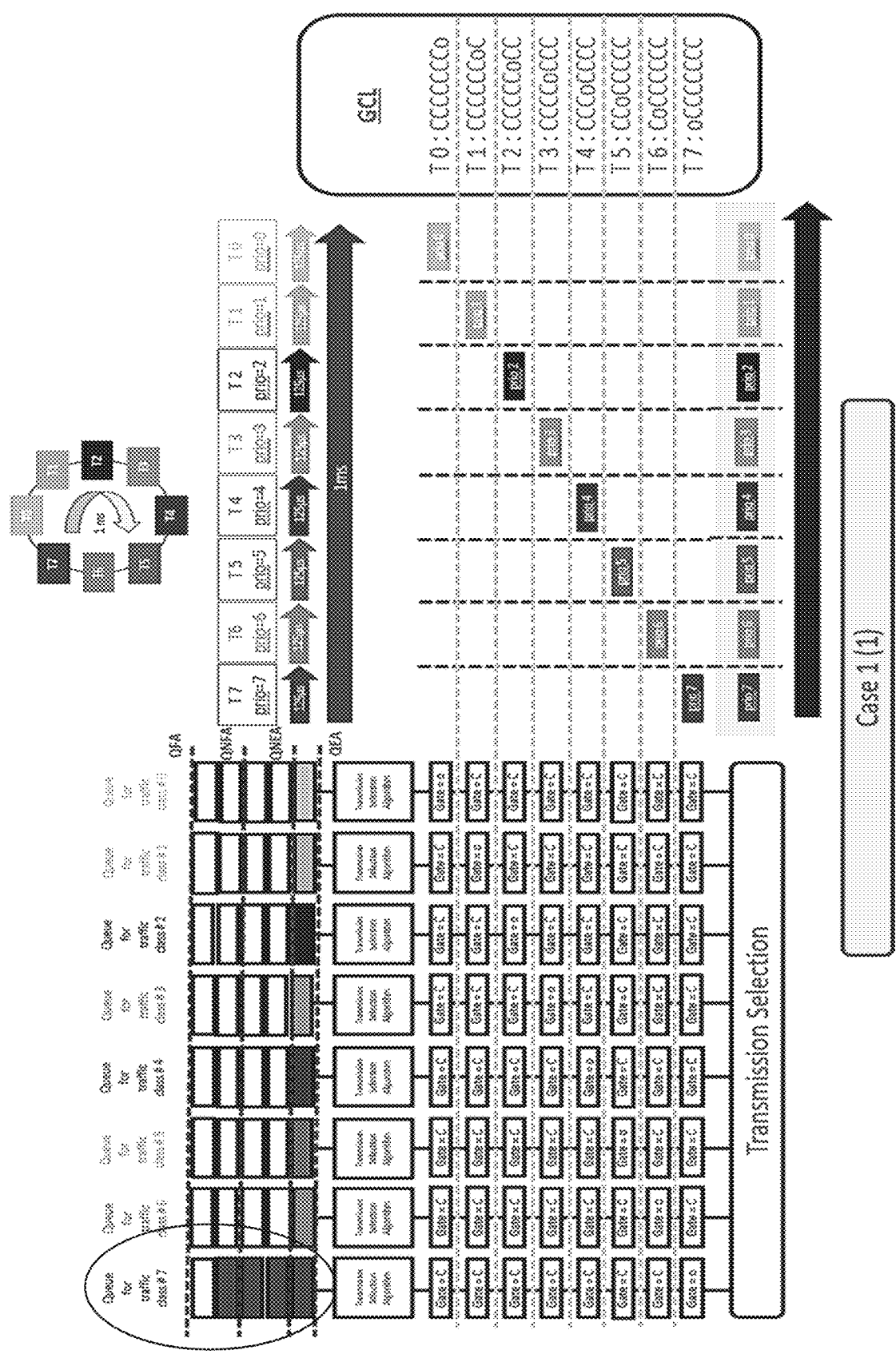
FIG. 8 shows an example of an IEEE 802.1Qbv implementation according to an embodiment of the disclosure.

FIG. 8 is based on FIG. 7, and shows a later time point of all eight queues. Notably, four thresholds for indicating events QFA, QNFA, ANEA and QEA are further illustrated in the figure. It can be seen that a quantity of frames in the queue of traffic class #7 (namely, queue 7) exceeds the threshold for triggering the QNFA event. This indicates a nearly full state of that queue. According to an embodiment of the disclosure, this threshold may be the first threshold defined in the previous embodiments. This information will be provided to a controller 400, particularly the controller 400 as shown in FIG. 4 or FIG. 6. Therefore, the controller 400 knows that the queue with priority 7 is nearly full, i.e., it requests more buffer, otherwise further arriving frames that with high priority may be dropped.

Using the approach defined in the previous embodiments, the controller 400 may determine a low priority queue that accept to give from its buffer. Further, the controller 400 may generate a new IPV entry for that low priority queue, in order to indicate the network node 410 to re-orient one or more arriving frames of queue 7 to the determined low priority queue.

Figure 9:
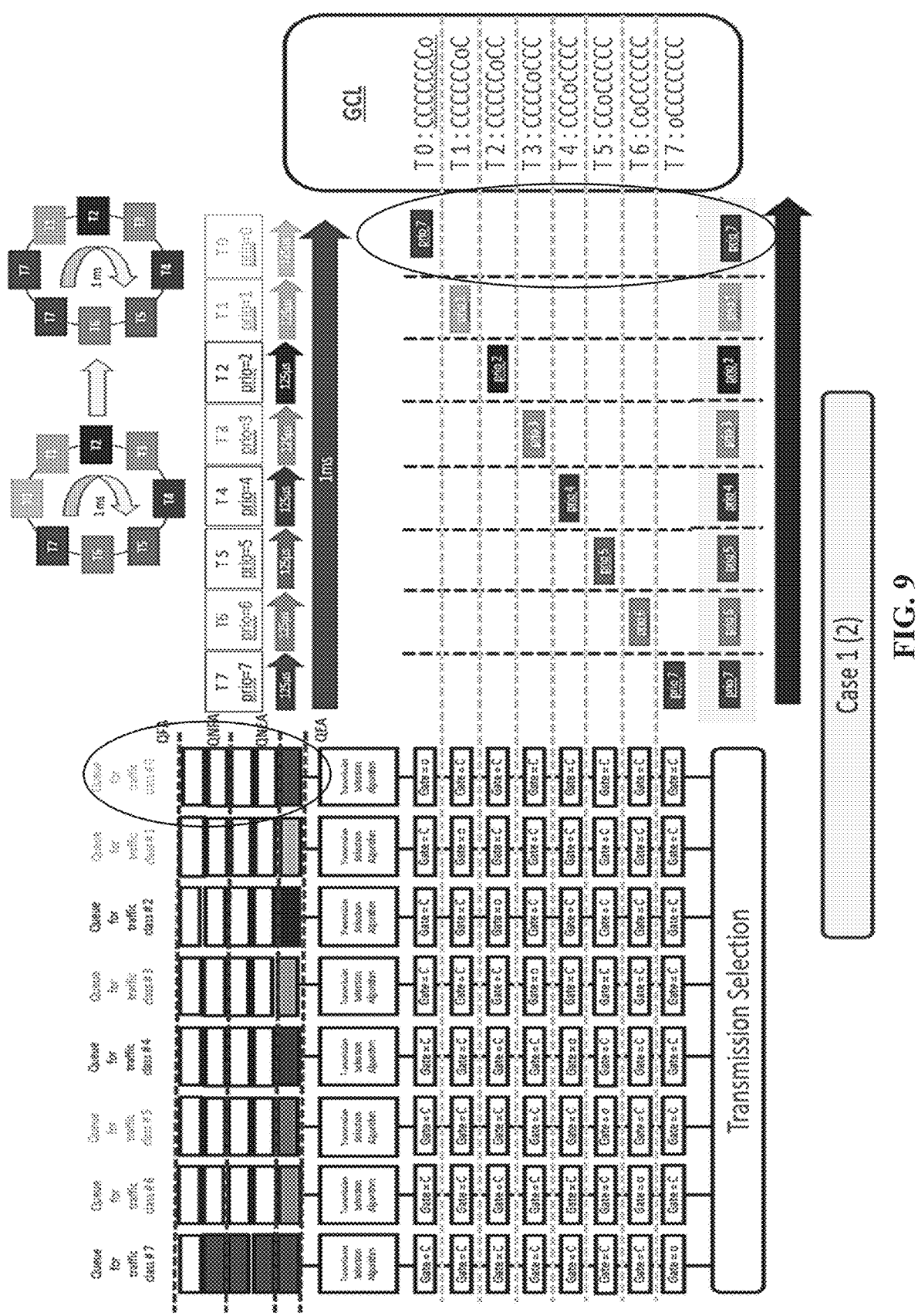
FIG. 9 shows an example of an IEEE 802.1Qbv implementation according to an embodiment of the disclosure.

FIG. 9 is based on FIG. 8. At the time point shown in FIG. 9, the controller 400 has generated a new priority entry for the exceeding frames of the high priority nearly full queue. As previously described, the exceeding frames refer to incoming frames of the high priority nearly full queue, since the QNFA threshold is exceeded. The generated priority entry (i.e., 0) for the exceeding frames of the queue for traffic class #7 equals to the priority entry of the nearly empty low priority queue, i.e., the queue with priority 0. Accordingly, the network node 410 re-orients a high priority (prio 7) arriving frame to queue 0, as shown in FIG. 9. That is, the first time-slot T0 that is allocated for queue 0 will continue sending frames for queue 0, and in addition this time with the exceeding frames from queue #7 (prio=7).

Figure 10:
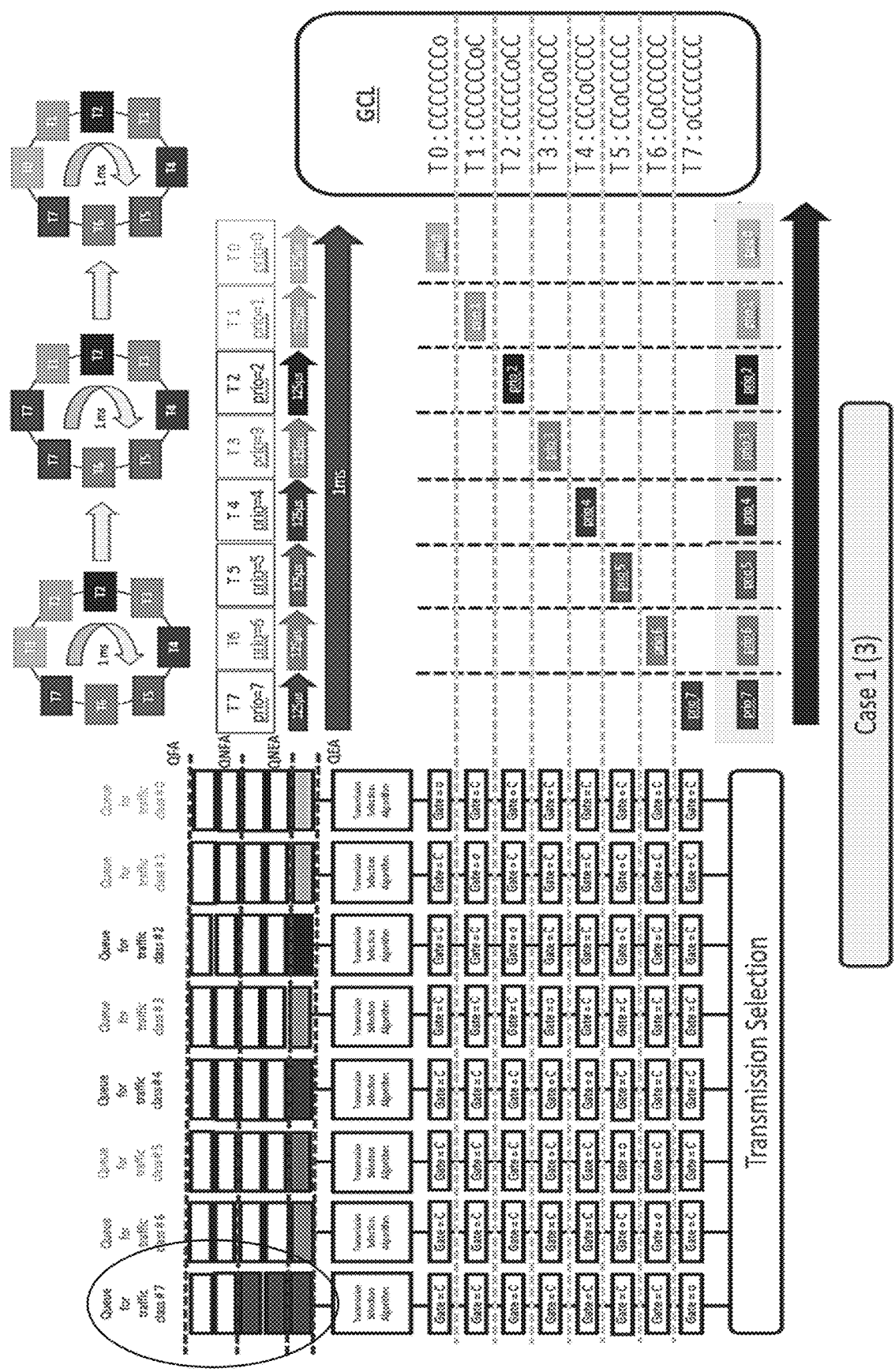
FIG. 10 shows an example of an IEEE 802.1Qbv implementation according to an embodiment of the disclosure.

FIG. 10 is further based on FIG. 9. It can be seen that once the arriving frames being re-oriented, the quantity of frames in queue 7 no longer exceed the QNFA threshold. That is, for queue 7, the QNFA event is not triggered anymore. In this way, queue 7 delivers its overloaded frames and thus avoids dropping them.

The updated state of queue 7 (no longer exceed the QNFA threshold) is provided to the controller 400. Accordingly, the controller 400 restores the default IPV entry setting for arriving frames for queue 7, i.e., prio 7. Therefore, the first time-slot T0 sends again frames only from queue 0 (prio=0).

Figure 11:
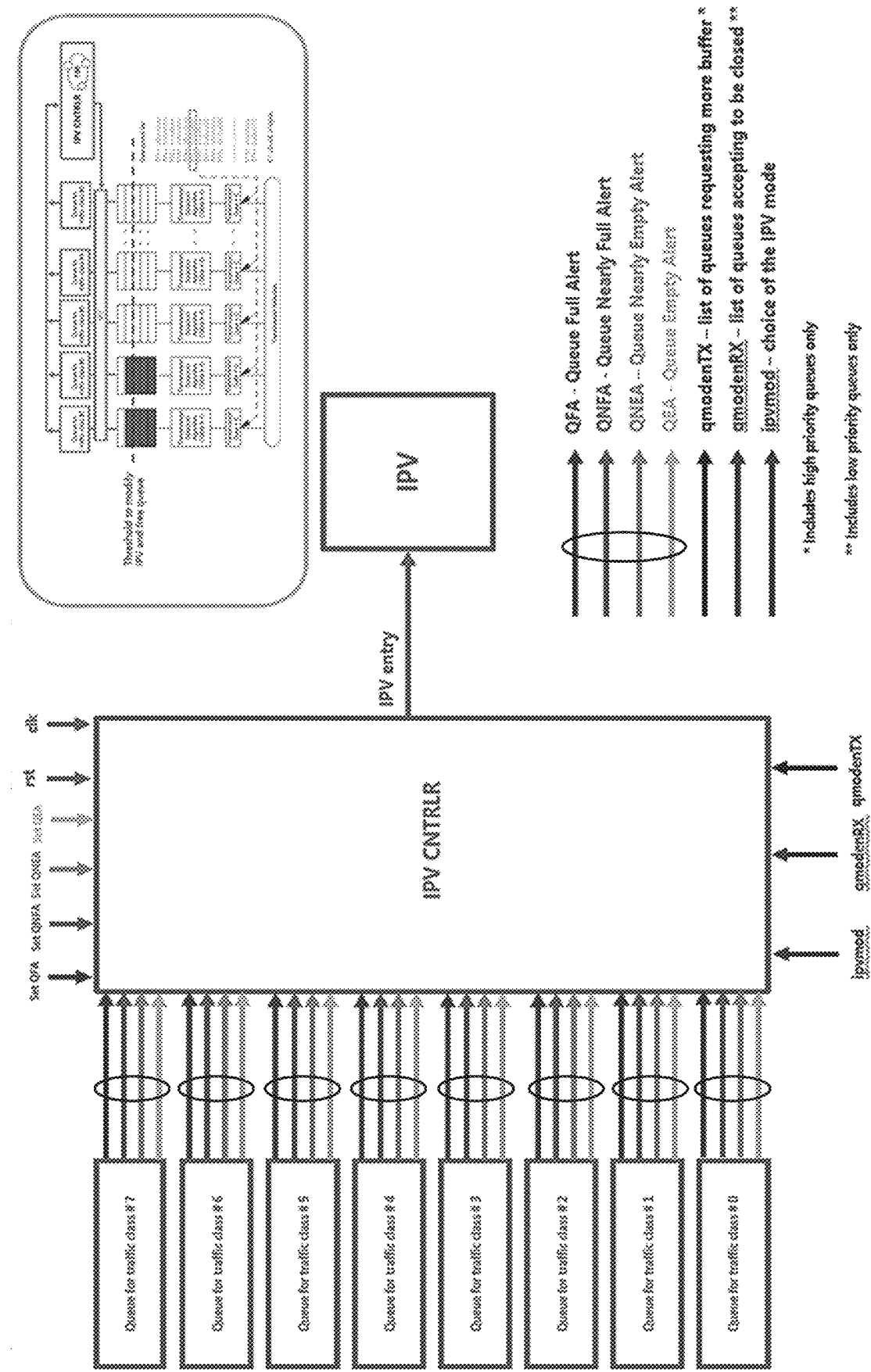
FIG. 11 shows a hardware implementation according to an embodiment of the disclosure.

FIG. 11 shows a hardware implementation according to an embodiment of the disclosure. Notably, the different queues will send updates to IPV controller (i.e., the controller 400 as shown in FIG. 4 or FIG. 6). The updates may concern the following events: QFA, QNFA, QNEA and QEA.

High priority queues may be configured in the system via "qmodenTX", which represents a list of queues requesting more buffer. Low priority queues may be configured in the system via "qmodenRX", which represents a list of queues accepting to receive frames from other queues. Further, in order to allow a high flexibility of implementation, a plurality of modes of the mechanism may be configured via "ipvmod".

Figure 12:
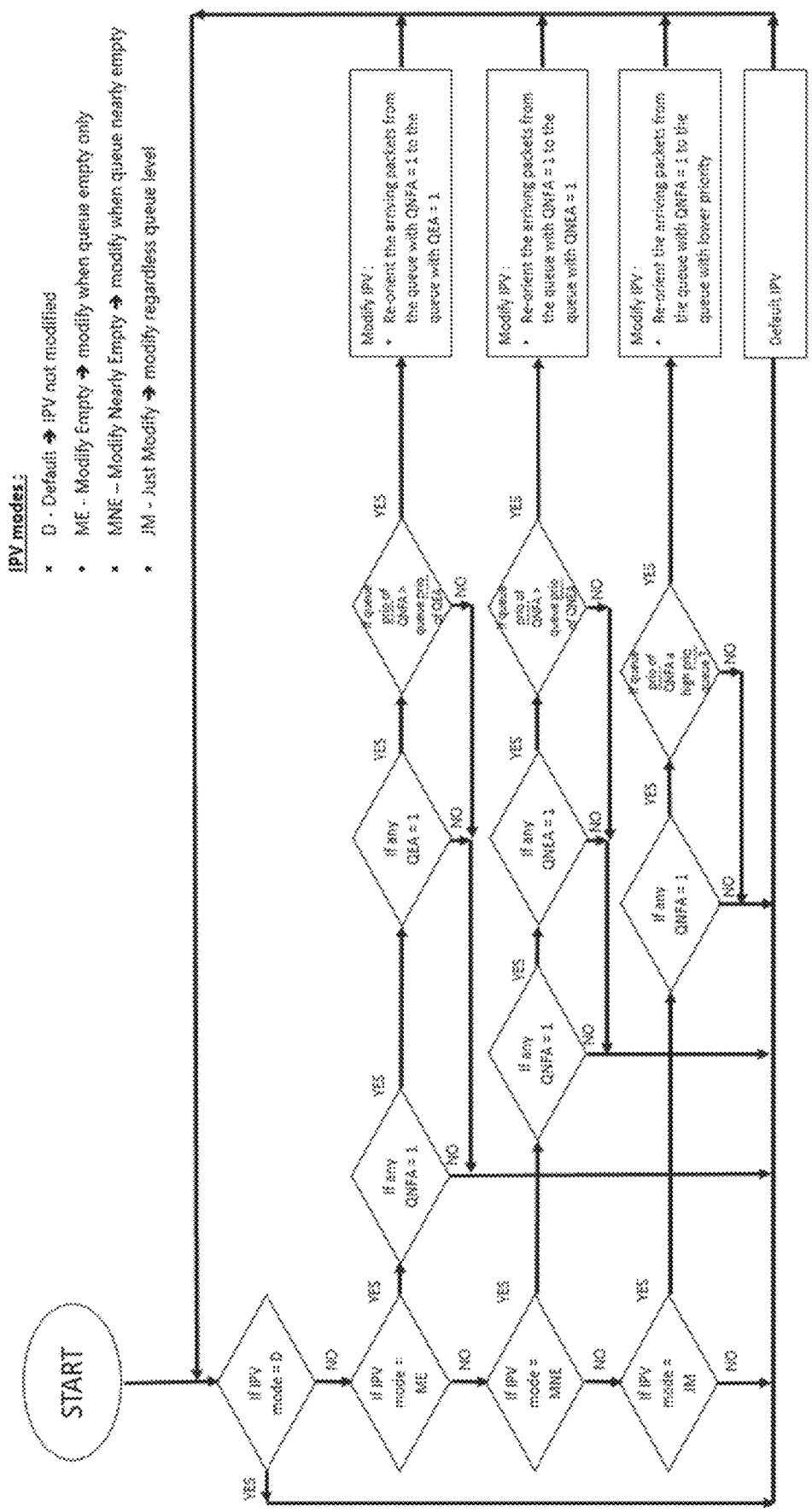
FIG. 12 shows an algorithm according to an embodiment of the disclosure.

FIG. 12 shows an algorithm according to an embodiment of the disclosure, based on four different modes:
  Mode "D" (Default): Apply the default IPV without modification
  Mode "ME" (Modify Empty): Apply the new IPV only when the target low priority queue is empty
  Mode "MNE" (Modify Nearly Empty): Apply the new IPV when the target low priority queue is nearly empty
  Mode "JM" (Just Modify): Apply the new IPV regardless the status of the target low priority queues Notably, in different modes, the adaptive and dynamic IPV solution can be implemented differently. For mode "D", the adaptive and dynamic IPV is not applied.

Figure 13:
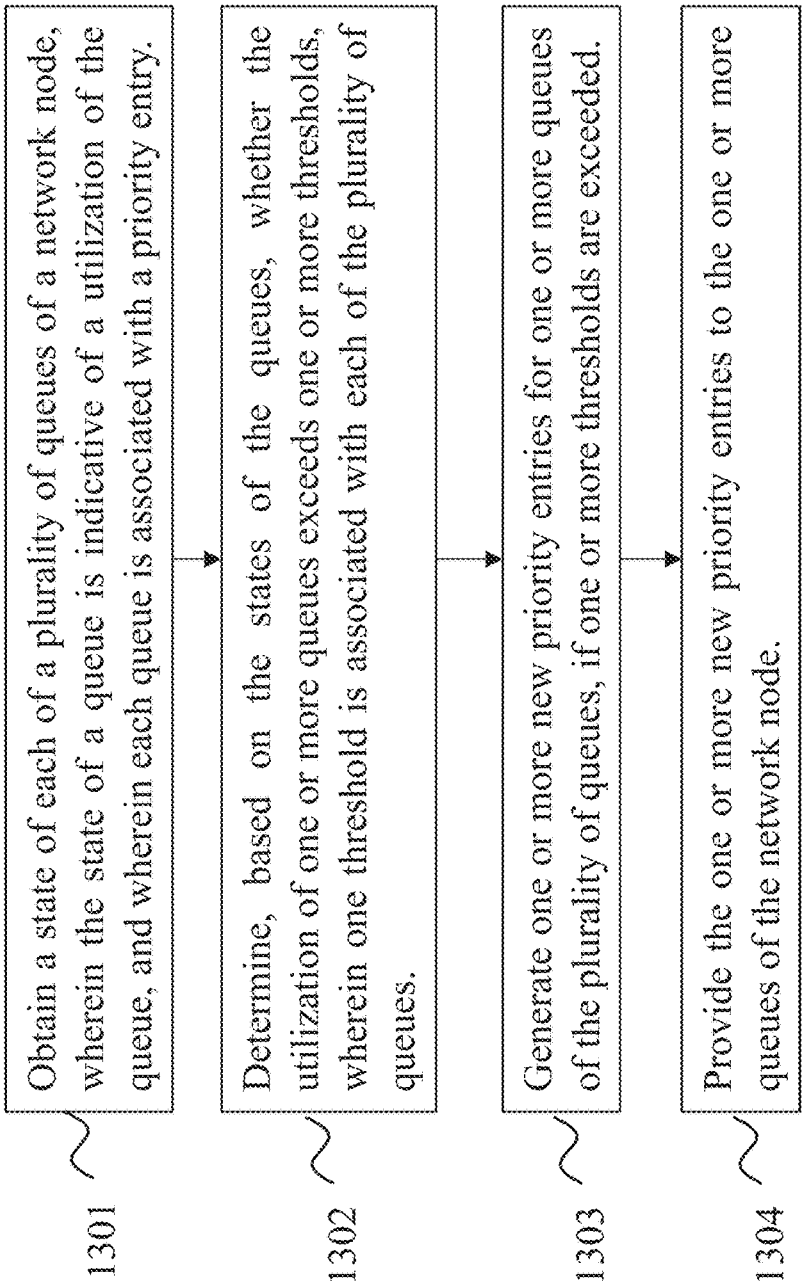
FIG. 13 shows a method according to an embodiment of the disclosure.

FIG. 13 shows a method 1300 according to an embodiment of the disclosure. In a particular embodiment, the method 1300 is performed by a controller 400 shown in FIG. 4 or FIG. 6. In particular, the method 1300 comprises a step 1301 of obtaining a state 401 of each of a plurality of queues of a network node 410. Possibly, the network node 410 may be a network node 410 shown in FIG. 4 or FIG. 6. In particular, the state 401 of a queue is indicative of a utilization of the queue, and wherein each queue is associated with a priority entry. The method further comprises a step 1302 of determining, based on the states 401 of the queues, whether the utilization of one or more queues exceeds one or more thresholds, wherein one threshold is associated with each of the plurality of queues. Further, the method 1300 comprises a step 1303 of generating one or more new priority entries 402 for one or more queues of the plurality of queues, if one or more thresholds are exceeded. Then, the method 1300 further comprises a step 1304 of providing the one or more new priority entries 402 to the one or more queues of the network node 410.

Figure 14:
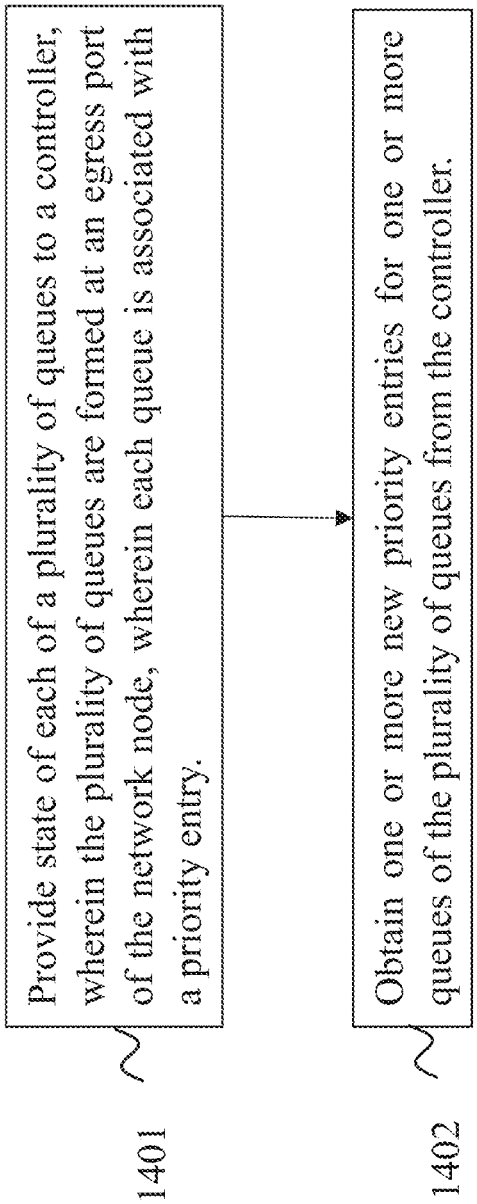
FIG. 14 shows a method according to an embodiment of the disclosure.

FIG. 14 shows a method 1400 according to an embodiment of the disclosure. In a particular embodiment, the method 1400 is performed by a network device 410 shown in FIG. 4 or FIG. 6. In particular, the method 1400 comprises a step 1401 of providing a state 401 of each of a plurality of queues to a controller 400. Possibly, the controller 400 may be a controller 400 shown in FIG. 4 or FIG. 6. The plurality of queues are formed at an egress port of the network node 410, wherein each queue is associated with a priority entry. The method 1402 further comprises a step 1402 of obtaining one or more new priority entries 402 for one or more queues of the plurality of queues from the controller 400.

To summarize, this disclosure proposes to implement adaptive and dynamic IPV (per frame) based on the network queues status. Accordingly, embodiments of the disclosure provide a controller and a network node. The innovate controller, i.e., the controller 400, brings major level of flexibility to the queues, makes network nodes more robust to changes in traffic load conditions. The controller also optimizes the usage of the total amount of memory devoted to queues by modifying on the fly the frame's traffic class (queue). In particular, IPV entries will be modified at runtime, depending on the traffic needs. Since the frames with high priority having overloaded queues will be re-oriented to other queues capable of receiving additional packets, this disclosure is able to prevent the drop of high priority packets and to improve thus the QoS in critical network scenarios.

The present disclosure has been described in conjunction with various embodiments as examples as well as implementations. However, other variations can be understood and effected by those persons skilled in the art, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

Furthermore, any method according to embodiments of the disclosure may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the controller 400 and/or the network device 410 comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, trellis-coded modulation (TCM) encoder, TCM decoder, power supply units, power feeders, communication interfaces, communication protocols, etc. which are suitably arranged together for performing the solution.

Especially, the processor(s) of the controller 400 and/or the network device 410 may comprise, e.g., one or more instances of a CPU, a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

What is claimed is:

1. A controller, the controller comprising:
  processing circuitry configured to:
    obtain a state of each respective queue of a plurality of queues of a network node, wherein the state of a respective queue is indicative of a quantity of frames in the respective queue, and wherein each respective queue is associated with a priority entry;

determine, based on the states of the plurality of queues, that a quantity of frames in one or more respective first queues exceeds a first threshold of one or more thresholds, wherein the first threshold is indicative of a nearly full state of a queue;

determine one or more second queues from the plurality of queues based on one or more default priority entries of the one or more second queues, wherein a default priority entry of each of the one or more second queues is lower than a respective default priority entry of one of the one or more first queues generate one or more new priority entries for the one or more first queues, wherein each of the one or more new priority entries equals a respective default priority entry of one of the one or more second queues; and provide the one or more new priority entries to the one or more queues of the network node.

2. The controller according to claim 1, wherein the one or more thresholds are configurable.

3. The controller according to claim 1, wherein the one or more thresholds comprises a second threshold indicative of a nearly empty state of a queue, and/or a third threshold indicative of an empty state of a queue.

4. The controller according to claim 3, the processing circuitry being further configured to:

determine the one or more second queues from the plurality of queues based on the one or more default priority entries of the one or more second queues, a state of each of the one or more second queues, and the second threshold or the third threshold, wherein a quantity of frames in each second queue does not exceed the second threshold or the third threshold.

5. The controller according to claim 1, wherein the generated one or more new priority entries triggers the network node to re-orient one or more arriving frames from the one or more first queues to the one or more second queues.

6. The controller according to claim 1, wherein each of generated one or more new priority entries is indicative of a priority level, wherein the priority level is configurable.

7. The controller according to claim 1, the processing circuitry being further configured to:

obtain an updated state of each of the plurality of queues from the network node.

8. The controller according to claim 7, the processing circuitry being further configured to:

set each of the one or more generated priority entries back to a default priority entry based on a determination that no queue has a quantity of frames that exceeds the first threshold.

9. A system comprising:

the controller according to claim 1; and a network node comprising processing circuitry configured to:

provide the state of each respective queue of a plurality of queues to a the controller according to claim 1, wherein the plurality of queues are formed at an egress port of the network node, and wherein each respective queue is associated with a priority entry; and obtain the one or more new priority entries from the controller.

10. The system according to claim 9, the processing circuitry of the network node being further configured to:

re-orient one or more arriving frames inside the plurality of queues based on the one or more new priority entries.

11. The system according to claim 9, the processing circuitry of the network node being further configured to:

provide an updated state of each of the plurality of queues to the controller.

12. A method performed by a controller, the method comprising:

obtaining a state of each respective queue of a plurality of queues of a network node, wherein the state of a respective queue is indicative of a quantity of frames in the respective queue, and wherein each respective queue is associated with a priority entry;

determining, based on the states of the plurality of queues, that the a quantity of frames in one or more respective first queues exceeds a first threshold of one or more thresholds, wherein the first threshold is indicative of a nearly full state of a queue;

determining one or more second queues from the plurality of queues based on one or more default priority entries of the one or more second queues, wherein a default priority entry of each of the one or more second queues is lower than a respective default priority entry of one of the one or more first queues;

generating one or more new priority entries for the one or more first queues, wherein each of the one or more new priority entries equals a respective default priority entry of one of the one or more second queues; and providing the one or more new priority entries to the one or more queues of the network node.

13. A computer program product comprising program code stored on a non-transitory computer readable medium, the program code comprising instructions that, when implemented on a processor, cause the processor to perform the method according to claim 12.

14. The method according to claim 12, wherein the one or more thresholds are configurable.

15. The method according to claim 12, wherein the one or more thresholds comprises a second threshold indicative of a nearly empty state of a queue, and/or a third threshold indicative of an empty state of a queue.

16. The method according to claim 15, wherein determining the one or more second queues from the plurality of queues is further based on a state of each of the one or more second queues and the second threshold or the third threshold, wherein a quantity of frames in each second queue does not exceed the second threshold or the third threshold.

17. The method according to claim 12, wherein the generated one or more new priority entries triggers the network node to re-orient one or more arriving frames from the one or more first queues to the one or more second queues.

18. The method according to claim 12, wherein each of generated one or more new priority entries is indicative of a priority level, wherein the priority level is configurable.

19. The method according to claim 12, further comprising obtaining an updated state of each of the plurality of queues from the network node.

20. The method according to claim 19, further comprising setting each of the one or more generated priority entries back to the default priority entry based on a determination that the utilization of no queue exceeds the one or more thresholds.

* * * * *